United States Patent [19]

Welder

[11] Patent Number: 4,527,685
[45] Date of Patent: Jul. 9, 1985

[54] ROBOT ASSEMBLY STATION

[75] Inventor: William C. Welder, Gilroy, Calif.

[73] Assignee: Raymond Production Systems Corporation, Hollister, Calif.

[21] Appl. No.: 470,579

[22] Filed: Feb. 28, 1983

[51] Int. Cl.³ ............................................. B65G 47/00
[52] U.S. Cl. .................................... 198/339; 198/485; 198/346
[58] Field of Search ............... 198/346, 339, 485, 345, 198/580, 597, 797

[56] References Cited

U.S. PATENT DOCUMENTS

| | | | |
|---|---|---|---|
| 2,659,473 | 11/1953 | Fahey et al. | 198/346 X |
| 2,668,614 | 2/1954 | Lawson | 198/746 |
| 3,036,692 | 5/1962 | Kiefer | 198/485 X |
| 3,308,921 | 3/1967 | Bower | 198/345 |
| 3,576,246 | 4/1971 | Hulet et al. | 198/485 X |
| 4,449,277 | 5/1984 | Hasegawa et al. | 198/345 X |

FOREIGN PATENT DOCUMENTS

| | | | |
|---|---|---|---|
| 979841 | 12/1975 | Canada | 198/472 |
| 1494639 | 7/1967 | France | 198/345 |
| WO83/00478 | 2/1983 | PCT Int'l Appl. | 198/346 |

Primary Examiner—Joseph E. Valenza
Assistant Examiner—Jonathan D. Holmes
Attorney, Agent, or Firm—Limbach, Limbach & Sutton

[57] ABSTRACT

A robot assembly station is provided for use with a programmable distribution system which includes a moving belt for transferring articles between various locations. The assembly station comprises various functional elements which engage and further position articles being received from the moving belt securing the articles in a final work position in a relatively rigid, accurately aligned configuration.

5 Claims, 4 Drawing Figures

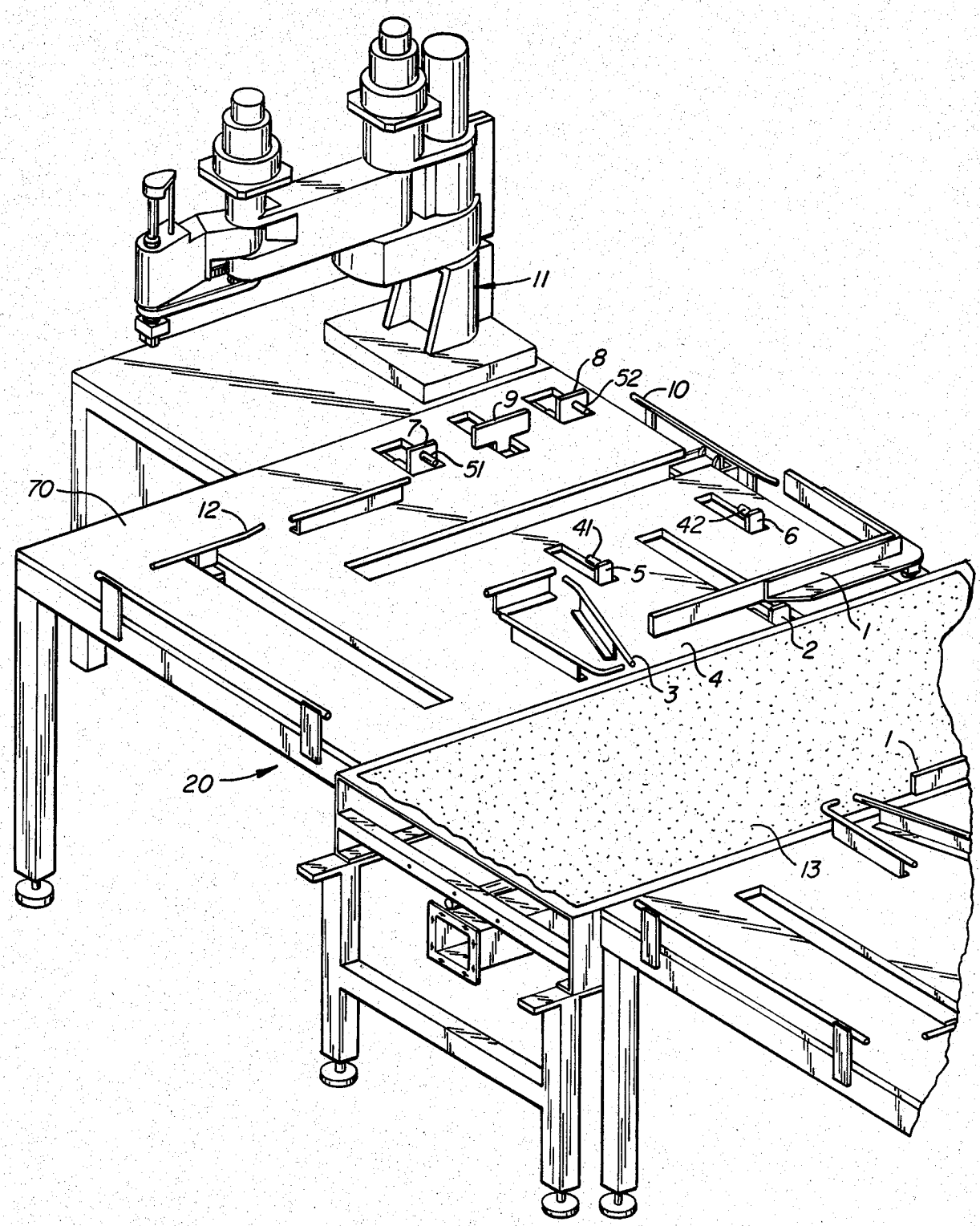
FIG._1.

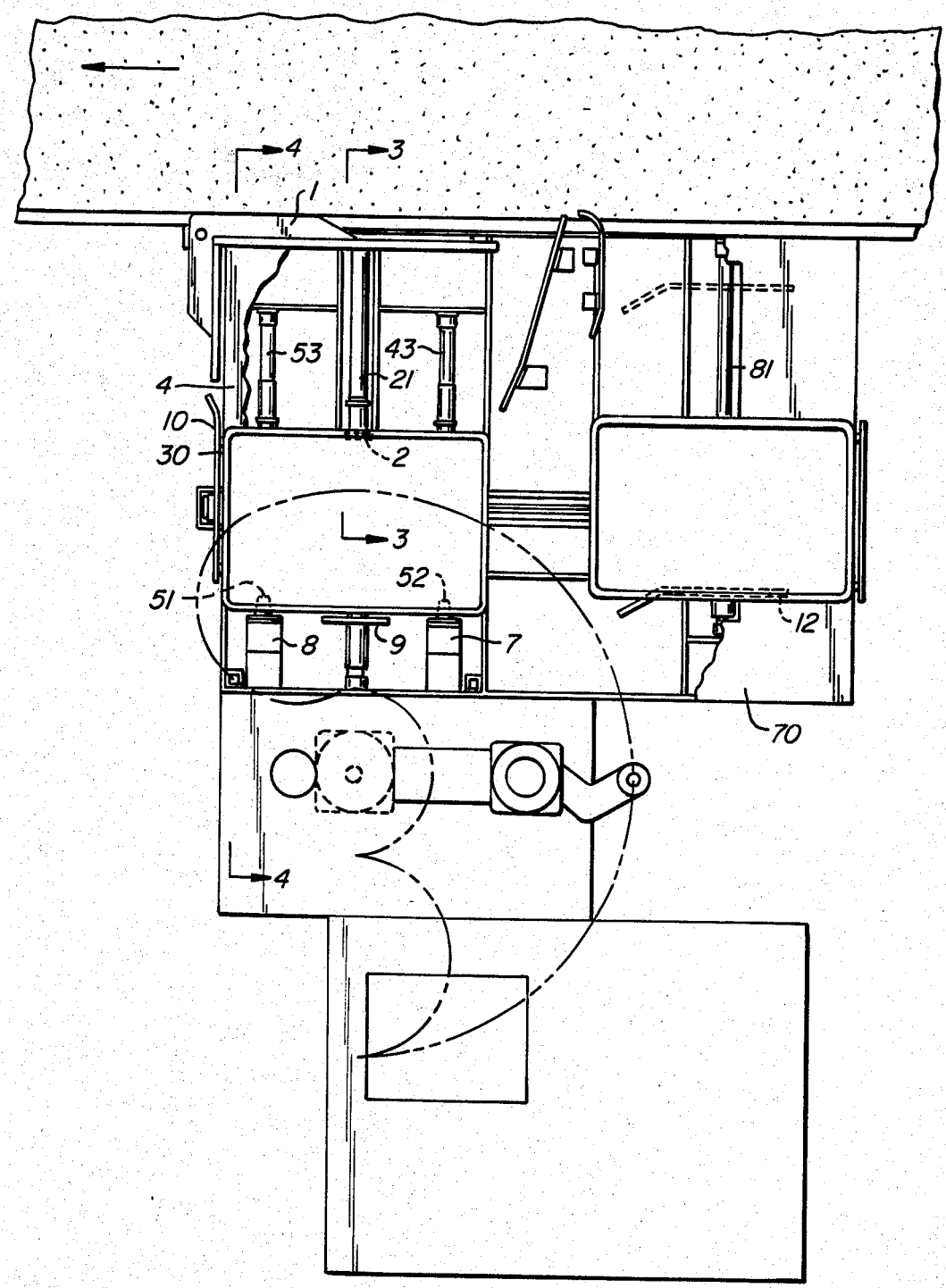
FIG._2.

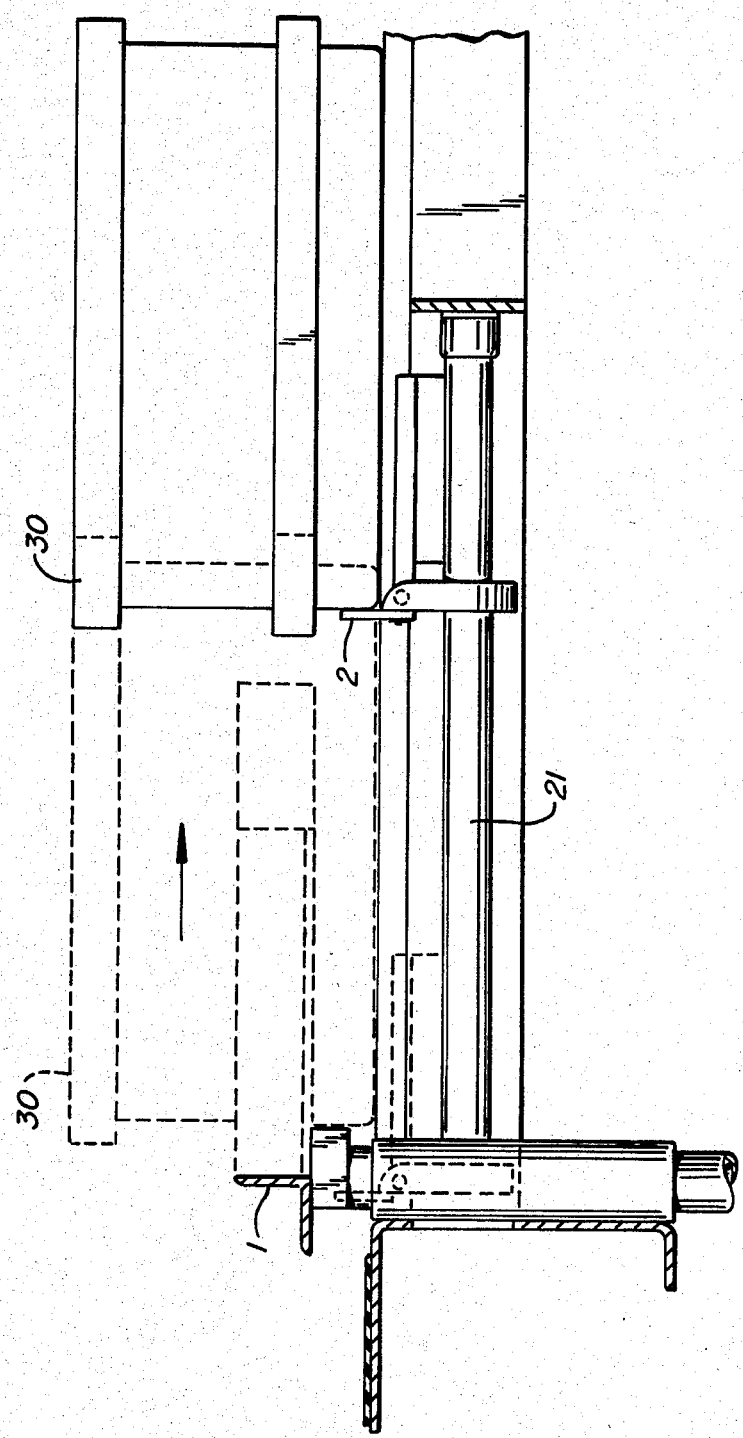
FIG._3.

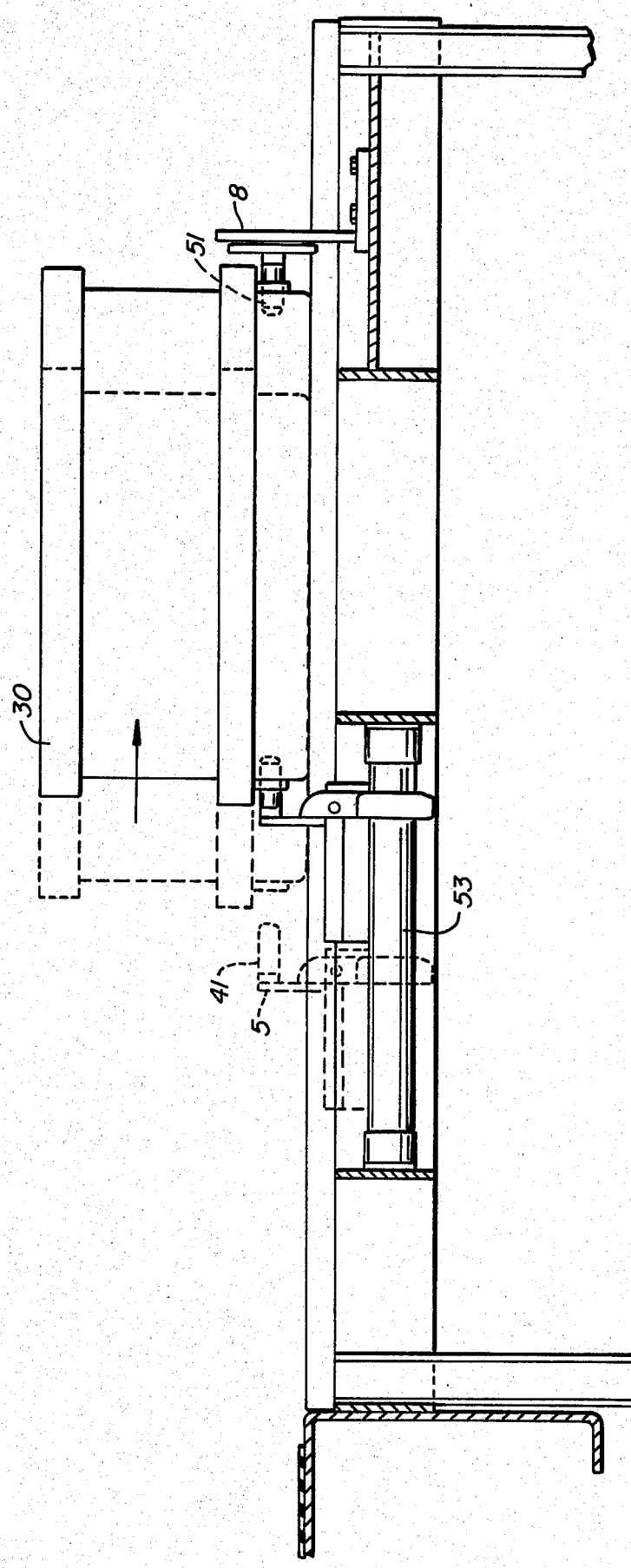

ROBOT ASSEMBLY STATION

TECHNICAL FIELD OF INVENTION

This invention relates generally to material transporters, and more particularly to such transporters for moving work pieces among various work stations in an assembly line production system. Although such a transporter was disclosed and certain improvements claimed in related application Ser. No. 291,497 filed on Aug. 10, 1981, it is now of particular interest to modify the disclosed transporter for use with robotic assemblies. As such, it is now determined to be necessary to provide a work station which could not only receive but also accurately and rigidly align a work piece article for feeding a pre-programmed robotic arm.

BACKGROUND OF THE INVENTION

A popular transporter for work stations utilizes an elongated belt that moves at a continuous high rate of speed for moving article or baskets of articles from an end of the belt to an appropriate work station. When that particular work station has completed its operation on the article or articles, they are returned to the front of the system belt and transported to a different work station for the next succeeding operation to be performed on them. The articles are placed on the belt at each work station and removed from the belt at a succeeding work stations by arms that extends across the belt to divert the article.

As was disclosed in the related application referenced above, certain improvements were made to the above-described transporter system. Among these improvements was the configuration of the diverter arm to extend at an angle in excess of 45° to the direction of travel of the moving belt. Further, the diverting arm was fabricated as a sweep arm structure having first and second substantially straight arms joined together orthogonally at a vertex. By providing the improved angular relationship between the sweep arm and the direction of travel of the articles to be diverted and by providing the orthogonal construction, it was determined that an article could be removed from a traveling belt and fed to various work stations while (1) maintaining the orientation of the article and (2) accurately placing the article onto a work station in a predetermined and preselected position with an accuracy much greater than prior art devices.

The above-described transporter system, although representing a marked improvement over similar devices of the prior art nevertheless could not be used as a means of feeding a robotic station. The transporter device of U.S. application Ser. No. 291,497 can effectuate the removal of a work piece from a moving belt and position it without change in orientation, onto a work station or second moving belt with a projected accuracy of ±⅛ inch. A robotic arm, however, which has been programmed to travel in a predetermined arc requires the positioning of work pieces within several thousandths of an inch.

It is thus an object of the present invention to provide a transporter device for use with a robotic arm whereby work pieces are capable of being precisely and rigidly positioned for engagement by the robotic device.

It is yet another object of the present invention to provide a robot assembly station for use with a programmable distribution system which eliminates virtually all of the shortcomings of the prior art.

These and further objects of the present invention will be more fully appreciated when considering the following disclosure and appended drawings wherein:

FIG. 1 is a perspective view of the robot assembly station of the present invention;

FIG. 2 is a plan view of the working components of the robot assembly station;

FIG. 3 represents a cross-sectional view taken along line A—A of FIG. 2; and

FIG. 4 is a cross-sectional view taken along line B—B of FIG. 2.

SUMMARY OF THE INVENTION

The present invention deals with a robot assembly station for use with a programmable distribution system which includes a moving belt for transferring articles between various locations. The robot assembly station comprises a sweep arm which in turn comprises, in plan view, first and second substantially straight arms joined together substantially orthogonally at a vertex. Means are provided for holding the arm structure with its vertex alongside but off the belt for permitting rotation of the arm about said vertex. Means are also provided for rotating the arm structure for moving it between a rest position and an article capturing position, said rest position holding the arm structure with the first arm substantially parallel to the belt and the second arm extending away therefrom, said article capturing position being with the first arm extending across the belt to capture an article at an angle in excess of 45°. An article being carried by the belt is stopped by the first arm and slid by action of the belt therealong toward the second arm, the article then being removable from the belt by rotating the arm structure from its article capturing position to its rest position, thus locating the article in a receiving orientation on an assembly table.

The assembly table structure comprises a substantially horizontal support surface for supporting the article and extending up from said surface is a pusher biased normally in a substantially vertical position but being pivotally mounted to rotate in such a manner as to allow the article to slide thereover when the article is being accepted onto the assembly table by the sweep arm structure but which assumes its normally vertical orientation once the article has past. Means are provided for advancing the pusher and thus the article to a final position where it is contacted by means for securing the article in its final work position in a relatively rigid, accurately aligned configuration.

DETAILED DESCRIPTION OF THE INVENTION

Reference is made to FIG. 1 which shows a portion of the transporter system including moving belt 13 and sweep arm structure 1. No attempt will be made to describe the transporter system generally or the sweep arm structure for related application Ser. No. 291,497 describes these components in great detail. The disclosure of said related application is hereby incorporated by reference. It is robotic assembly station 20 to which the present invention is particularly concerned and thus a detailed discussion will be made of said station whose boundary is basically determined by substantially horizontal support surface 4 for accepting work pieces for feeding a robotic arm.

Although the present invention is not limited by the specific nature of any particular work pieces, it is noted that the present invention is particularly well adapted for use with a tote basket containing small parts to be manufactured such as semiconductor components or printed circuit boards. The robotic arm can be pre-programmed to perform a specific function upon the circuit boards such as lifting the components out of the tote or basket and placing them on a circuit board tester and returning the components to the basket once the test has been completed.

In order to accomplish the above, it is necessary that the tote or basket be accurately and rigidly positioned in a preselected location for the robotic arm, once programmed, is incapable of modifying its arc of travel to account for misaligned work pieces. This critical alignment is achievable by practicing the present invention.

Once the tote or basket has been removed from moving belt 13, it passes over pusher 2 which is biased normally in a substantially vertical position (as shown) but the pusher is pivotally mounted to rotate in such a manner as to allow the article to slide thereover when the article is being accepted onto the assembly table. Once the tote travels over pusher 2, the pusher assumes its normally vertical orientation. Reference is particularly made to FIG. 2 and the accompanying description thereof found in the specification of related application Ser. No. 291,497 for a complete description of the pusher mechanism and how it performs the function outlined above.

As a preferred embodiment, pusher 2 is functionally connected to a rodless air cylinder 21 (FIG. 2), the details of which are again shown in FIG. 4 of the related application. It is noted that the pusher assembly 2 can be caused to move either toward or away from moving belt 13 depending upon which end of cylinder 21 compressed air is applied. A solenoid operated air valve (not shown in this application but shown in the related application) directs compressed air from a source conduit to either the far end of the cylinder through a hose or the end closest to belt 13 through yet another hose. Once cylinder 21 has been fully extended, the solenoid causes compressed air to be directed at the end of cylinder 21 most remote from belt 13 causing a retreat of pusher 2.

Prior to activation of cylinder 21, it is noted that through the practice of the present invention, the tote has been removed from moving belt 13 and has not only maintained its orientation upon removal but the tote has been roughly placed in a predetermined position by means of sweep arm 1 and optional guide means 3. Activation of cylinder 21 by tripping pusher 2 results in a movement of tote 30 toward robotic arm 11.

As a further preferred embodiment, a second set of pushers 5 and 6 are provided which are functionally connected to rodless air cylinders 53 and 43 much in the same manner as described above regarding the relationship between pusher 2 and air cylinder 21. Functionally, once air cylinder 21 has been fully extended, pushers 5 and 6 have been caused to pivot or rotate from their normally vertical position to allow tote 30 to pass over. Full extension of cylinder 21 will trip a solenoid (not shown) and activate cylinders 53 and 43 by causing compressed air to enter said cylinders at their ends closest belt 13, causing pushers 5 and 6, now in a vertical position, to engage basket 30 and push it closer toward robotic arm 11.

As most clearly illustrated by FIGS. 1 and 4, pushers 5 and 6 are preferably configured with projections 41 and 42, respectively, which are adapted to engage complementary surfaces of tote 30. Ideally, the receiving surfaces are located proximate the corners of tote 30 to aid in maintaining the tote in a rigid confirmation.

As tote 30 is pushed away from moving belt 13, stops 7 and 8 also configured in a substantially vertical posture are endowed with projections 51 and 52 for similarly engaging complementary surfaces of tote 30. In this configuration, it is readily apparent that once cylinders 53 and 43 have been fully extended and projections 41, 42, 51 and 52 caused to mate with corresponding receiving areas of tote 30, the tote is now held in a substantially rigid confirmation whose positioning is accurately maintained.

Upon completion of the work performed by robotic arm 11, the work piece or tote 30 is now ready for discharge back onto the main transporter line. As a preferred embodiment, discharge of the tote can be accomplished as follows. Once the robotic arm has completed its function, a signal is given to the central processing unit which causes stops 7 and 8 to recede away from the tote by actuation of airless cylinders connected thereto. At the same time, pusher 9 acts to further disengage the tote from engaging elements 51 and 52 while pushers 5 and 6 similarly withdraw disengaging elements 41 and 42 from the corners of tote 30. Once the tote has been freed, guide rod 10 similarly driven by an airless cylinder then progresses down its channel to urge tote basket 30 toward receiving area 70. Upon completion of this motion, the robot assembly station is now ready to accept yet another work piece.

In tying into the overall system, it is noted that tote basket 30 can reside at station 70 until the central processing unit receives the signal from a downstream location that this particular article is ready for further processing. Upon the receipt of an appropriate signal, rod 12 begins its motion through activation of airless cylinder 81, thus urging tote basket 30 back upon conveyor 13.

I claim:

1. A robot assembly station for use with a programmable distribution system which includes a moving belt for transferring articles between various locations, said robot assembly station comprising:
   A. a sweep arm structure comprising:
      (1) in plan view, first and second substantially straight arms joined together substantially orthogonally at a vertex,
      (2) means holding said arm structure with its vertex alongside but off said belt for permitting rotation of said arm about said vertex, and
      (3) means providing rotating power to said arm structure for moving it between a rest position and an article capturing position, said rest position holding said arm structure with said first arm substantially parallel to said belt and the second arm extending away therefrom, said article capturing position being with said first arm extending across said belt to capture an article in an acute angle made by said first arm and the length of said belt, said acute angle being in excess of 45°, whereby an article being carried by the belt is stopped by said first arm and slid by action of the belt therealong toward the second arm, the article being removed from the belt by rotating said arm structure from its arm capturing position to its rest position, thus locating said object in a receiving orientation on an assembly table;

B. an assembly table structure comprising:
  (1) a substantially horizontal support surface for supporting said article,
  (2) first and second pushers biased normally in a substantially vertical position but being pivotally mounted to rotate in such a manner as to allow the article to slide thereover when said article is being accepted onto the assembly table by said sweep arm structure but which assume their normally vertical orientations once the article is past,
  (3) means for advancing said first pusher to an intermediate position at least to a point beyond said second pusher,
  (4) means for advancing said second pusher and thus said article to a final position,
  (5) means provided on said second pusher for engaging said article and securing it in its final work position in a relatively rigid, accurately aligned configuration, and
  (6) at least one substantially vertical projection arranged to project from the surface of the assembly table and positioned to provide a forward stop to the article, and
  (7) means for pushing the article away from said vertical projections after the article is no longer required to reside at the robot assembly station.

2. The robot assembly station of claim 1 wherin said second pusher comprises two pusher elements, each functionally connected to advancement means.

3. The robot assembly station of claim 2 wherein the forward face of each pusher possesses means for securely engaging complementary surfaces located proximate the corners of the article.

4. The robot assembly station of claim 1 wherein said vertical projection possesses means for securely engaging a complementary surface of the article.

5. The robot assembly station of claim 1 wherein means is further provided for pushing the article off the assembly station and onto an adjoining station after the article is no longer required to reside at the robot assembly station.

* * * * *